(12) United States Patent
Boge et al.

(10) Patent No.: US 7,188,433 B2
(45) Date of Patent: Mar. 13, 2007

(54) SENSOR AND METHOD OF MOUNTING IT

(75) Inventors: Ludwig Boge, Jena OT Jenapriessnitz/Wogau (DE); Heinz-Gunther Franz, Hamburg (DE); Hans-Joachim Freitag, Erfurt (DE); Andreas Schmidt, Erfurt (DE)

(73) Assignee: Optolab Licensing GmbH, Hamburg (DE)

( * ) Notice: Subject to any disclaimer, the term of this patent is extended or adjusted under 35 U.S.C. 154(b) by 0 days.

(21) Appl. No.: 11/186,624

(22) Filed: Jul. 21, 2005

(65) Prior Publication Data

US 2006/0021242 A1 Feb. 2, 2006

(30) Foreign Application Priority Data

Jul. 23, 2004 (EP) .................. 04017468

(51) Int. Cl.
*G01B 21/06* (2006.01)
(52) U.S. Cl. .......................... 33/706; 33/613
(58) Field of Classification Search ............... 33/613, 33/645, 706, 707, 708, 832, 833, 834
See application file for complete search history.

(56) References Cited

U.S. PATENT DOCUMENTS

| | | | |
|---|---|---|---|
| 3,655,482 A | | 4/1972 | Schildkraut et al. |
| 4,600,203 A | * | 7/1986 | Miller et al. .................. 33/706 |
| 5,489,804 A | * | 2/1996 | Pasch .......................... 29/840 |
| 5,611,148 A | * | 3/1997 | Affa ............................. 33/702 |
| 5,979,238 A | * | 11/1999 | Boege et al. .................. 33/755 |
| 6,145,213 A | * | 11/2000 | Shimano et al. ............... 33/702 |
| 6,189,208 B1 | * | 2/2001 | Estes et al. ..................... 29/840 |
| 6,219,247 B1 | * | 4/2001 | Haupt et al. .................. 29/840 |
| 6,349,481 B1 | | 2/2002 | Nelle |
| 6,826,847 B2 | * | 12/2004 | Wahl et al. .................... 33/706 |
| 6,865,820 B2 | * | 3/2005 | Burgschat et al. ............. 33/706 |
| 2002/0063321 A1 | | 5/2002 | Sauter et al. |
| 2006/0016089 A1 | * | 1/2006 | Kawada et al. ................ 33/706 |

FOREIGN PATENT DOCUMENTS

| | | |
|---|---|---|
| DE | 27 56 500 | 6/1979 |
| DE | 40 02 514 A1 | 8/1990 |
| EP | 0 433 513 A1 | 6/1991 |
| EP | 1 041 363 A2 | 10/2000 |
| GB | 2 228 519 A | 8/1990 |
| JP | 06306332 | 11/1994 |

\* cited by examiner

*Primary Examiner*—G. Bradley Bennett
(74) *Attorney, Agent, or Firm*—Patterson, Thuente, Skaar & Christensen, P.A.

(57) ABSTRACT

What is described is a structural part comprising a mounting surface (M) for mounting the mounting surface to an attachment surface, wherein means for adhesive-bonding the mounting surface (M) with the attachment surface are provided, in order to glue the structural part to the attachment surface, and wherein spacers are provided on the mounting surface (M), said spacers causing a predetermined gap (S) between the mounting surface (M) and the attachment surface when attaching the structural part to the attachment surface and being removable and/or deformable by pressing the structural part onto the attachment surface.

19 Claims, 6 Drawing Sheets

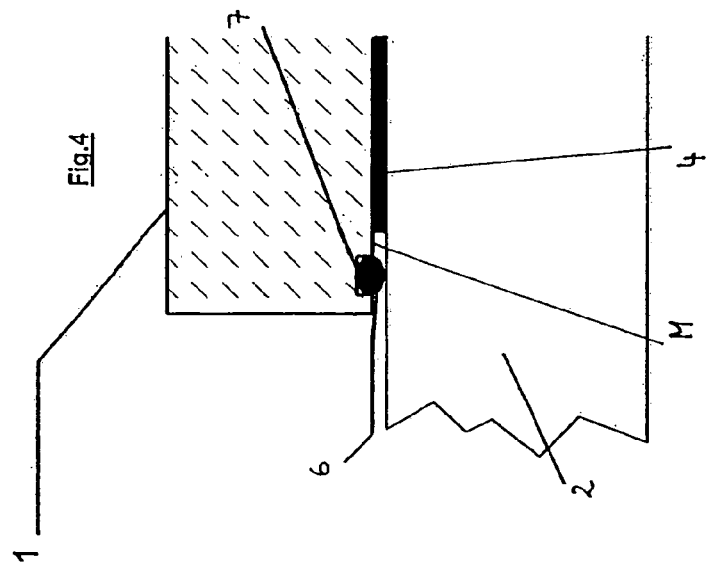
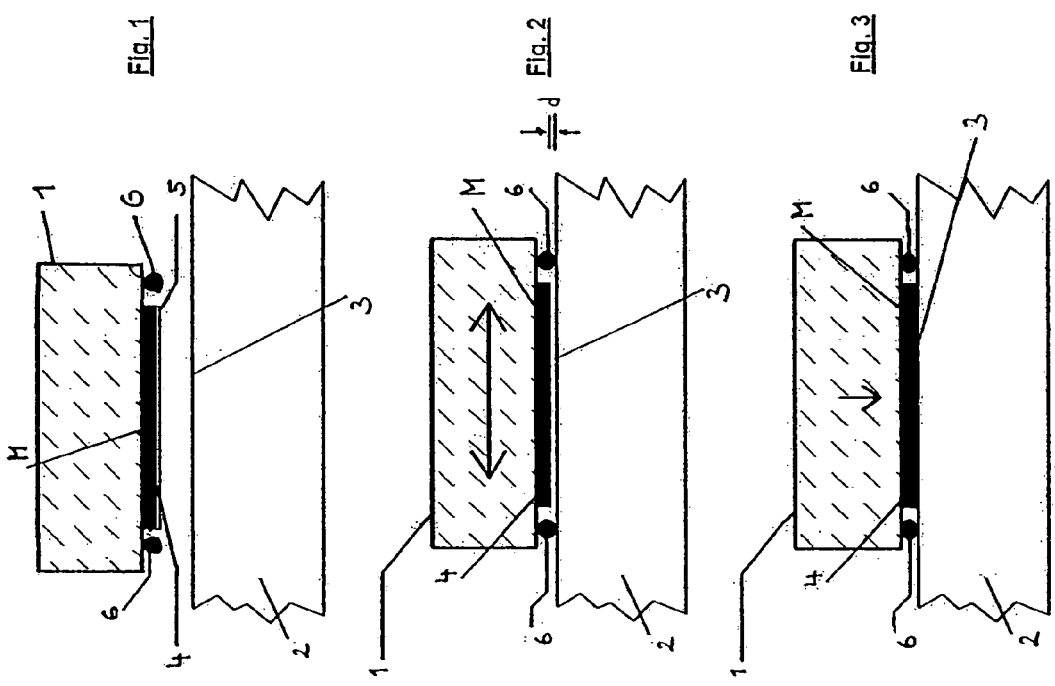

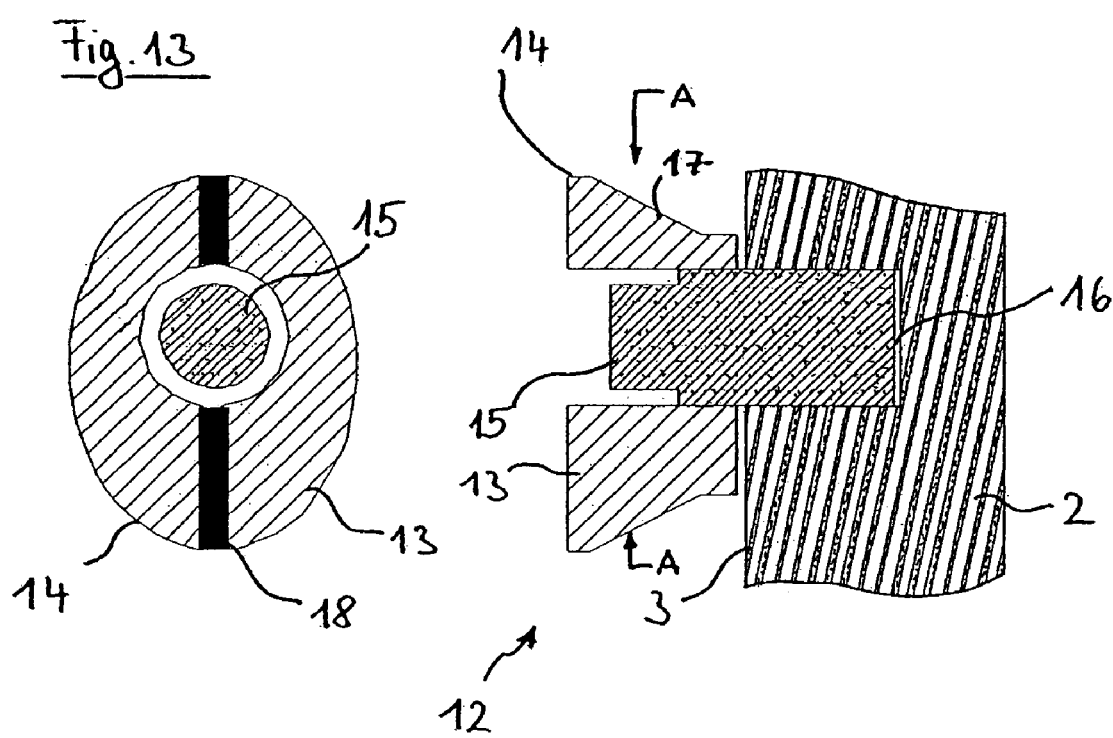

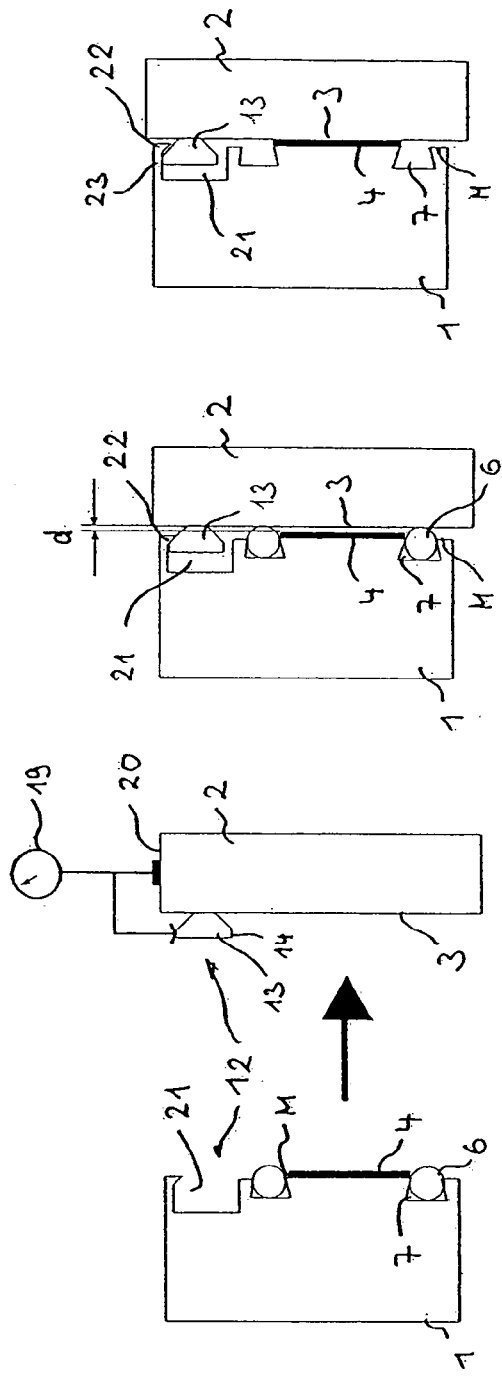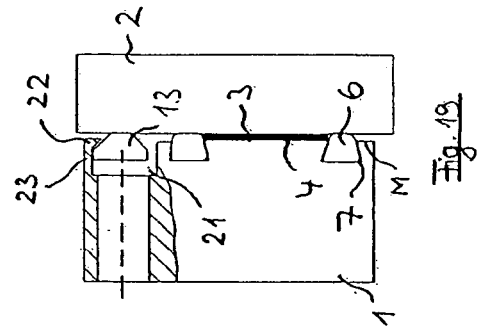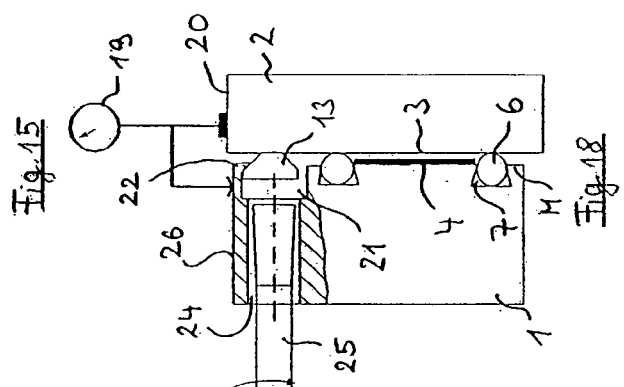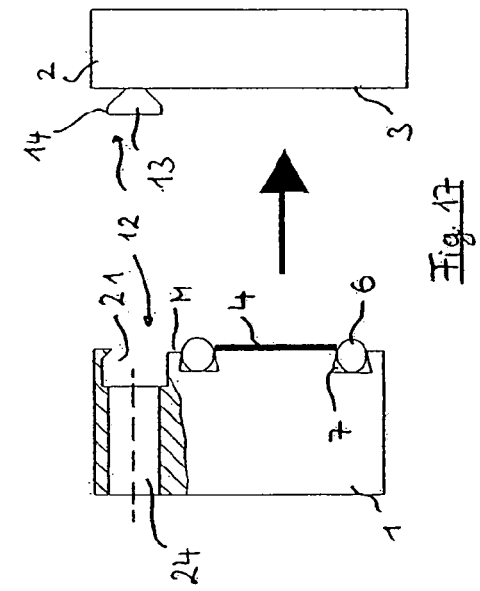

SENSOR AND METHOD OF MOUNTING IT

CROSS-REFERENCE TO RELATED APPLICATION

Field of the Invention

The invention relates to a structural part comprising a mounting surface for mounting to an attachment surface, with means being provided for adhesive-bonding the mounting surface with the attachment surface, so as to glue said structural part to the attachment surface. The invention further relates to a method of mounting a structural part to an attachment surface, wherein a mounting surface of said structural part is adhesive-bonded to the attachment surface.

BACKGROUND OF THE INVENTION

In many cases, structural parts have to be mounted to attachment surfaces in predetermined positions. Adhesive bonds have turned out to be particularly favorable for such mounting, because they are easy to apply, but screw connections or clamped connections are also used. An example of a structural part to be adhesive-bonded is present, for example, in length or angle measuring systems, in which it is very common to glue transducer elements to be optically sensed to the corresponding machine part. This is mentioned, inter alia, in U.S. Pat. No. 5,979,238.

Adhesive connections are particularly easy to apply if an adhesive film applied to the structural part is used, because this only requires a usually present protective paper to be pulled away and the adhesive layer to be activated, which may be done, for example, by applying pressure to adhesives that can be activated by pressure. However, this often results in the problem that the component has to be regularly brought into a certain adjusted position at the attachment surface before activating the adhesive connection and that said adjusted position should be maintained, if possible, when activating the adhesive.

Therefore, it is an object of the invention to improve a structural part of the aforementioned type and/or a mounting method of the aforementioned type so as to achieve both ease of mounting and of adjustment.

SUMMARY OF THE INVENTION

According to the invention, this object is achieved by a structural part as mentioned above having spacers provided at the mounting surface, said spacers, when contacting said structural part, causing a predetermined gap between the mounting surface and the attachment surface and being provided so as to be removable and/or deformable toward the attachment surface by applying pressure to the structural part. Analogously, a mounting method of the above-mentioned type achieves the above object, in which method spacers are provided on the mounting surface which are dimensioned such that, when the structural part contacts the attachment surface, a predetermined gap is provided between the mounting surface and the attachment surface, the structural part is adjusted, in a state contacting the attachment surface, into a predetermined position and, subsequently, the structural part is pressed against the attachment surface with the spacers being removed and/or deformed during this pressing.

The inventive structural part can be realized by any element which is to be mounted to the attachment surface in a predetermined position. This includes, for example, measuring elements, sensor elements, light-barrier elements or the like. It is particularly preferred to realize the structural part as a sensor element of a measuring system, in particular as a transducer of an angle or length measuring system, because in those cases, the requirements of adjustment are particularly exacting.

Since mutual mounting of the structural part and of the part comprising the attachment surface is to be effected, the spacers may, of course, be provided on either or both of said parts.

Thus, according to the invention, spacers are used in order to set a predetermined gap between the attachment surface and the mounting surface. If the mounting surface of the structural part is applied, with interposed spacers, to the attachment surface such that the predetermined gap is present between the mounting surface and the attachment surface, this results in an adjustment position in which the final position can be adjusted with high precision, except for the gap between the structural part and the attachment surface. Of course, such adjustment may be referenced both to the attachment surface or to a part comprising said attachment surface, or even to a third structural part. Advantageously taking into consideration the predetermined gap by means of a corresponding aiming-off allowance or offset, the structural part is exactly in the desired final position after final mounting. The predetermined gap is then closed by pressing the structural part onto the attachment surface. In this final position, final mounting takes place, i.e. the structural part is immovably mounted to the attachment surface. In the case of adjustments wherein the gap toward the attachment surface has no effect because, e.g., this coordinate is irrelevant or at least non-critical, the aiming-off allowance or offset may be left unconsidered.

For final mounting, material-locking connections (e.g. gluing) or form-locking or force-locking connections (screws, clamps) are suitable. For gluing, it is convenient to use the above-mentioned, easily applicable variant with an adhesive layer which may be provided either on the structural part or on the attachment surface. The final mounting in which the gap is closed by pressing the structural part onto the attachment surface, then represents the beginning of the gluing operation. If a pressure-activatable adhesive layer is used, activation of the adhesive is also caused at the same time.

Thus, the spacers have the basic function of ensuring a safe transition of the structural part from the adjusted position into the final position, without the occurrence of disadjustments. The spacers may preferably also provide an adjustment position by a combinatorial effect, by which the structural part is brought into the desired final position while taking into account an aiming-off allowance or offset which considers the gap.

When using an adhesive layer for gluing, it has to be ensured, of course, that the predetermined gap is greater than the thickness of the adhesive layer, so that, when applying the mounting surface to the attachment surface with spacers positioned therebetween, the adhesive layer does not yet contact the attachment surface. This is achieved only after the spacers are deformed or removed.

Therefore, a further embodiment is preferred in which an adhesive layer, which is thinner than the predetermined gap, is applied to the mounting surface, so that, during contact with the spacers not yet removed or deformed, there is a gap between the adhesive surface and the attachment surface, which gap can be closed by removing or deforming the spacers.

Analogously, a further embodiment of the mounting method is preferred, wherein an adhesive layer, which glues the structural part to the attachment surface when pressing it against the attachment surface, is provided on the mounting surface.

Further, the spacers may be used for shielding the adhesive bond, because they can be provided in the manner of a seal. This sealing and, thus, protecting effect of the spacers is even greater the more completely the spacers extend around the adhesive bond or the adhesive layer. It is advantageous, in particular, in longitudinally extending structural parts, if the spacers limit the adhesive layer at least at two edges.

In permanent, e.g. inelastically deformable spacers, the advantage is achieved that the adhesive connection between the structural part and the attachment surface is not subject to stresses caused by elastic restoring forces of the spacers. In contrast thereto, reversibly or elastically deformable spacers have a particularly good sealing effect, because the spacers shield the adhesive layer like a seal due to the restoring force exerted by them.

Therefore, it is convenient to use spacers which comprise an elastically or inelastically deformable portion or which are completely deformable. In particular, an elastomeric cord may be selected, which is particularly inexpensive in manufacture. Suitable materials for the spacers are: PU foam, styrofoam, epoxy foams, mineral materials, such as lime, gypsum, etc., wax, textile fabrics.

In many cases, the structural part is shipped to be mounted to the attachment surface by the customer. For reasons of easy mounting, it is then preferred that the structural part comprise at least one recess provided on the mounting surface, into which the spacer(s) is (are) inserted. This measure, on the one hand, provides a space required for deformation when using deformable spacers and, on the other hand, offers protection of the spacers against loss by falling off during mounting easily. Moreover, a groove is a possible realization of a displacement chamber into which material of the spacers may evade during deformation.

Under the aspect of a most reproducible adjustment position, whose precision ultimately has an effect on the precision of the final mounting, via the aiming-off allowance to be taken into consideration during adjustment, it is convenient to have the spacers contact a support in at least three points. It is further advantageous to dimension the gap between the adhesive layer and the attachment surface as small as possible. Advantageously, the size of the gap is between $1/100$ and $5/10$ mm.

The adjustment of a sensing head in the adjustment position may be assisted by any auxiliary means. If the structural part is part of a measuring system, the measuring system itself will conveniently be used to adjust the structural part. In an angle or length measuring system, a sensing head may be used, for example, which is already provided for the measuring system anyway, in order to effect said adjustment (taking into consideration, if necessary, the aiming-off allowance).

For adjustment of the structural part, a defined static contact with the attachment surface via the spacers is favorable. This may be ensured by spacers contacting the attachment surface in at least two points. Of course, a multi-point contact, for example a two- or three-point contact, or even a four-, five-, six-point contact, etc., is generally possible.

BRIEF DESCRIPTION OF THE DRAWINGS

The invention will be explained in more detail below, by way of example and with reference to the Figures, wherein:

FIG. 1 shows a schematic sectional view of a sensor element being adjusted and mounted to a structural part;

FIG. 2 shows the sensor element of FIG. 1 during the adjustment operation;

FIG. 3 shows the sensor element of FIG. 2 after the completed adjustment operation and during final mounting;

FIG. 4 shows a view of a detail of a sensor element similar to that of FIG. 3 in the finally mounted condition;

FIG. 12 shows a sectional view of a pre-mounting device for producing an adjustment position during the adjustment operation;

FIG. 13 shows a top view of the pre-mounting device of FIG. 12;

FIG. 14 shows a sectional view of a sensor element similar to FIG. 4, but comprising the pre-mounting device of FIGS. 13 and 14, during the adjustment operation;

FIG. 15 shows a representation similar to FIG. 14 comprising an adjusted pre-mounting device, during pre-mounting;

FIG. 16 shows the subassembly of FIG. 15 after final mounting;

FIG. 17 shows a representation similar to that of FIG. 14, with the sensor element enabling adjustment in the pre-mounted condition;

FIG. 18 shows a representation similar to FIG. 15, but with an adjustment taking place, and FIG. 19 shows a view similar to that of FIG. 16.

DETAILED DESCRIPTION

Figure 5:
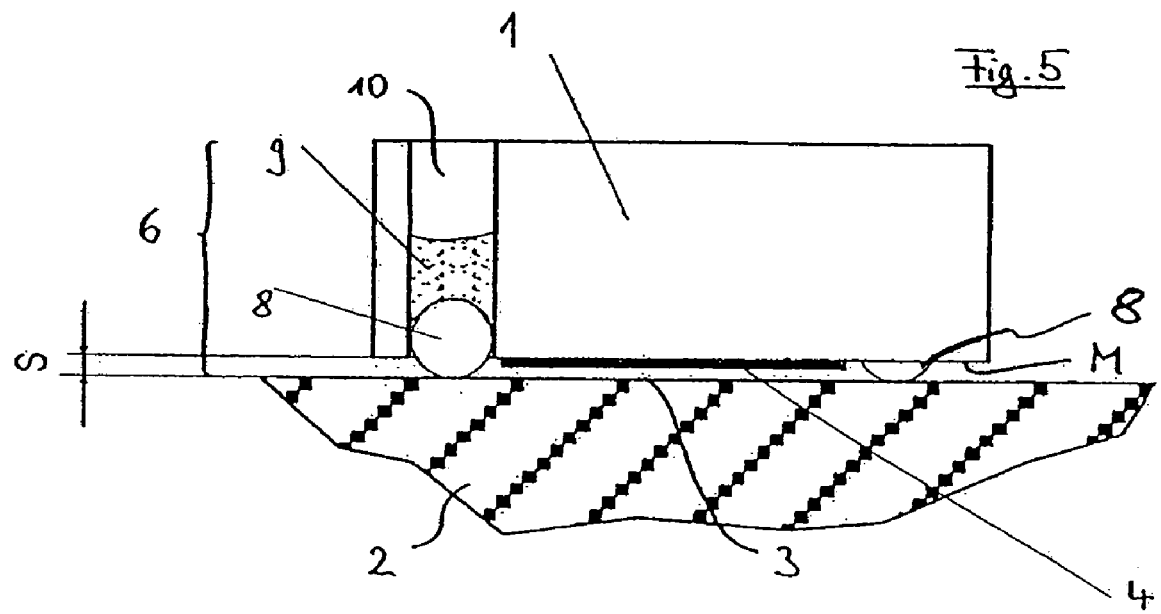
FIG. 5 shows a sectional view of another sensor element in the condition of the element of FIG. 2.

FIG. 1 shows a schematic sectional view of a sensor element 1, in a phase of the mounting process, before the sensor element 1 is mounted to a part 2. In the embodiment shown, the sensor element 1 is part of a measuring system (not shown in detail), which detects, for example, the movement of one machine part relative to another machine part. However, the sensor element may also be any other structural part which is to be mounted to an attachment surface or an attachment part in a determined position to be adjusted. It is merely essential for the following description that the element 1 be mounted to the part 2, e.g. to an attachment surface thereof, to achieve a position adjusted with high precision. The adjustment may relate to the part 2 or to a third part.

Mounting of the sensor element 1 to the part 2 is effected by gluing a mounting surface M of the sensor element 1 to the attachment surface 3, e.g. by means of an adhesive bond. For this purpose, an adhesive layer 4, which glues the sensor element 1 to the attachment surface 3, is provided on the mounting surface M of the sensor element 1 associated with the part 2 or with the attachment surface 3, respectively. Of course, the adhesive layer 4 can also be provided on the part 2. Since mounting of the sensor element 1 is usually effected only after providing the part 2 and, thus, on site, the adhesive layer 4 is usually covered by a protective paper 5 in order to prevent undesired activation of the adhesive layer 4 prior to mounting and, in particular, prior to final mounting of the sensor element 1.

For mounting, the protective paper 5 is pulled off the adhesive layer 4 in a preparatory step. This is followed by a pre-mounting step, in which the mounting surface M of the sensor element 1 is placed onto the attachment surface 3. In an adjustment step, the desired position for the sensor element 1 is then adjusted with high precision and, in a final mounting step, the adhesive layer 4 is finally activated in order to glue the sensor element 1 to the attachment surface 3. Usually use is made of pressure-activatable adhesives.

Since, in the case of pressure-activatable adhesives, contact of the adhesive layer 4 with the attachment surface initiates bonding, a system shown in FIG. 2 and comprising spacers 6, which support the sensor element 1 against the part 2 such that a gap having a thickness d remains between the adhesive layer 4 and the attachment surface 3, is provided for obtaining the final position in the adjustment step. Only when the sensor element 1 is positioned as desired (e.g. relative to the part 2) in the mounting process, adhesion is effected by removing and/or compressing the spacers. Since a change in the position of the sensor element 1 after adjustment would automatically lead to disadjustment, shifts in position after adjustment and prior to gluing the sensor element 1 to the part 2 should be avoided, as far as possible. Depending on the application, shifts in position of less than 10 µm are ideal. Therefore, in linear or angle measurement systems, d is preferably between 5/10 and 1/00 mm.

The spacers 6 shown in FIG. 2 position the mounting surface M comprising the adhesive layer 4 with a defined minimal gap above the attachment surface 3, so as to allow easy positioning of the sensor element, for example in the direction of the double arrow schematically represented in FIG. 2, in the adjustment step. Since, apart from the thickness d of the gap, the sensor element 1 already has the correct distance to the part 2 in this adjustment position, a sensing unit, which is provided for the sensor element anyway, may preferably be used for adjustment. Of course, suitable additional optical, mechanical, electrical or otherwise acting adjusting means can be employed as well.

For example, using the sensing unit, it is verified in the adjustment step whether the sensor element 1 is in the correct, finally adjusted position. Once said position is set, the sensor element 1 is glued to the attachment surface 3 by pressing it thereon in the final mounting step, as schematically shown in FIG. 3. When applying pressure in this manner, in the direction of the arrow shown in FIG. 3, the spacers 6 are deformed and the gap is closed.

The spacers 6 shown in FIGS. 1 to 3 and acting in the adjustment step may be realized, for example, in the form of deformable elements, e.g. by elastic cords, or the like. The construction shown in FIGS. 2 and 3 allows to pull the spacers out laterally after gluing, i.e. in the condition of FIG. 3, so that the adhesive bond is not subjected to stresses by a possible elastic restoring force. However, a suitably stable adhesive connection may also allow the spacers 6 to remain in place. The spacers 6 realize a stable adjustment position of the sensor element 1. Therefore, they are designed to match the attachment surface 3.

FIG. 4 shows an alternative embodiment similar to that of FIGS. 1 to 3. In this case, a groove 7 is provided on the sensor element 1, in which groove the spacers 6, here again being realized as elastic cords, are inserted and held. Due to the groove 7, the sensor element 1 can be shipped already equipped with spacers 6, because the latter are held in the groove 7, preferably undetachable. Of course, removal of the spacers after final mounting may be provided here, too, for example, by pulling the spacers 6 out of the groove 7. The groove 7 not only holds the spacers 6, but also provides a displacement space into which material may evade during deformation of the spacers 6. This allows the spacers to have a comparatively large volume in relation to the thickness of the adhesive layer 4. Of course, the groove 7 is only one example of a displacement space design.

Figure 6:
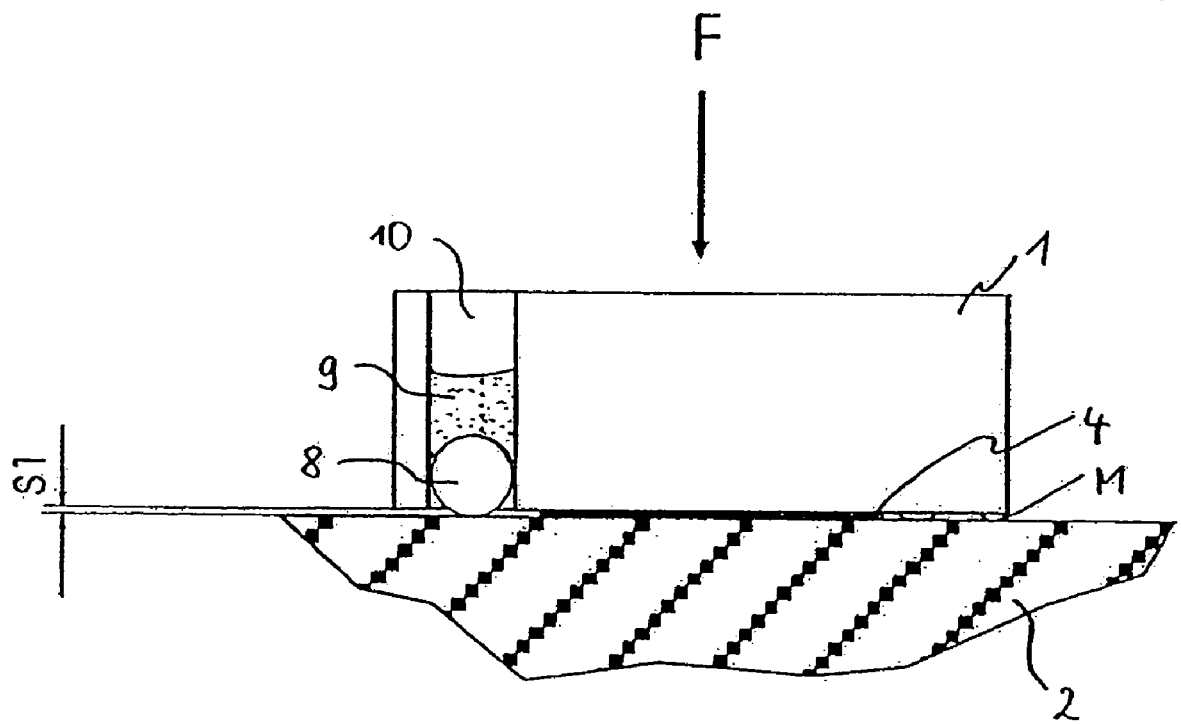
FIG. 6 shows the sensor element of FIG. 5 in the condition of the element of FIG. 3.

A further alternative embodiment, which is shown in FIGS. 5 and 6, clearly shows that the spacers may also be of a multi-part design. The deformable spacers which FIG. 2 shows inserted between the attachment surface 3 and the bottom surface of the sensor element 1 are realized, in the construction shown by the sectional view of FIG. 5, by a generally rigid body, realized as a ball 8, which is held in a bore 10 by a deformable adhesive 9. Thus, the spacers are of a multi-part design, comprising a rigid portion (ball 8) and a deformable portion (adhesive 9). The bracket 6 in FIG. 5 makes this general constructional principle clear.

The spacers 6 again realize a gap, because each ball 8 protrudes from the bottom surface of the sensor element 1 by the amount S. Due to the thickness of the adhesive layer 4, a gap is thus set between the adhesive layer 4 and the attachment surface 3. By applying a force F in the direction of the arrow shown in FIG. 6, each ball 8 is pushed into the bore 10 while deforming the adhesive 9, and the adhesive layer 4 glues the sensor element 1 to the attachment surface 3. The ball 8 is pushed into the bore 10 leaving a residual gap S 1 whose thickness corresponds to that of the adhesive layer 4.

In the position of FIG. 5, i.e. with the spacers 6 not yet deformed, the sensor element 1 can be adjusted to the desired position at the part 2; in this connection, what was said with reference to FIG. 1 to 3 also applies to this embodiment.

The construction according to FIGS. 5 and 6 clearly shows that the spacers 6 have two fundamentally different functional features here. On the one hand, they provide a predetermined gap between the mounting surface M of the sensor element 1 and the attachment surface 3 to which the sensor element 1 is to be mounted. Said gap is dimensioned such that gluing of the sensor element 1 does not yet take place, and an adjustment is still possible. Further, the spacers 6 are changeable such that the gap can be closed, e.g. by pressing the sensor element 1 toward the attachment surface 3. This allows the adhesive connection to be activated, but it is of no consequence to the effect and use of the spacers whether said adhesion is effected by means of an adhesive layer provided on the sensor element 1 or on the attachment surface 3. The change of the spacers 6 may be caused by deformation or also by removal of the spacers.

Of course, the principle of the spacers may also be reversed by providing the spacers on the part 2.

In particular, the deformation of the spacers 6 may be effected in an elastic or inelastic manner. The spacer may also have a multi-part design and one portion thereof may be provided, for example, as a special deformable element, which is realized by the adhesive 9 in the construction according to FIGS. 5 and 6. The use of an inelastic body which is supported on the deformable element allows the stroke of deformation and, above all, the force of deformation, which have to be surmounted when applying pressure to the sensor element 1, to be exactly set. If it is desired, for example, to modify the construction of FIG. 5 in terms of an elastic deformation of the spacers 6, the adhesive 9 may be replaced, for example, by a spring element supported in the bore 10.

Figure 7:
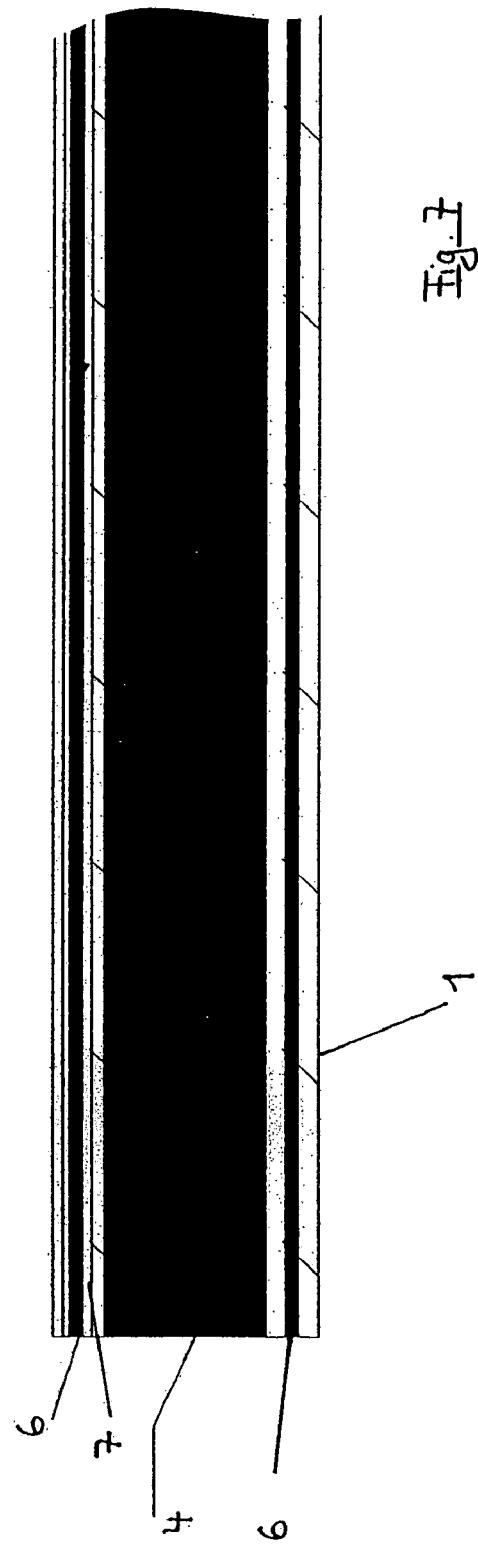
FIG. 7 shows a top view of an embodiment of the sensor element shown in sectional views in FIGS. 1 to 6.

FIG. 7 shows a view of the sensor element 1 of FIGS. 1 to 4, seen from the side comprising the adhesive layer 4. As can be seen, the elastic cord realizing the spacer 6 in this case is located in the groove 7 outside the region to which the adhesive layer 4 is applied. In FIG. 7, the sensor element 1 is shown, by way of example, as a rule of a length measuring system. Since such measuring systems are conventionally employed on machine tools, a second effect of the spacers 6 is advantageously put into practice here. The spacers 6 protect the adhesive layer along at least two longitudinal edges against intrusion of impurities or of substances impairing adhesion, such as oils or solvents. Such protection is generally present with non-punctiform spacers 6, if they outwardly limit the adhesive layer 4 at least partially. Said protection is even better the more completely the spacer 6 surrounds the region in which the sensor element 1 is glued to the attachment surface 3.

Figure 8:
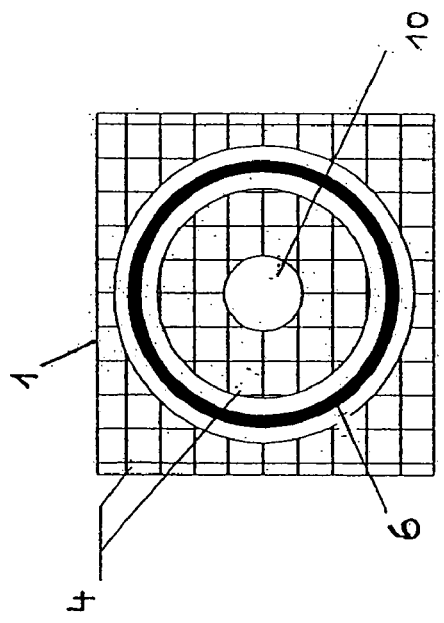

FIG. 8 shows an embodiment of a sensor element 1, wherein the spacer 6 is ring-shaped and completely surrounds an inner region of the adhesive layer 4. In order to secure the adhesive bond, a bore 10, through which a fastening element, e.g. a screw or a rivet, may be inserted, is provided in addition. In the embodiment example of FIG. 8, the bore 10 is formed in the center of the sensor element 1, because a screw connection is provided there.

Figure 9:
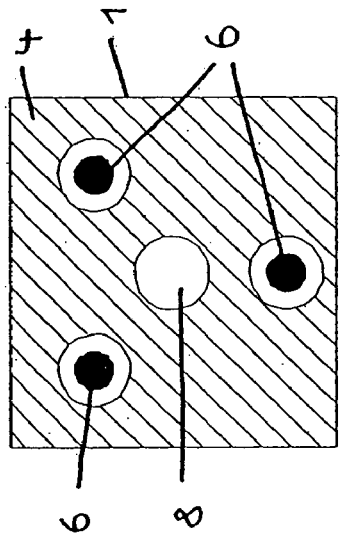
FIGS. 8 and 9 respectively show top views, analogous to FIG. 7, of further embodiments.

FIG. 9 shows an alternative embodiment of the sensor element 1 of FIG. 8. In this case, the spacer 6 provides a three-point contact, which causes a high-precision, tilt and interference free adjustment of the gap S between the attachment surface 3 and the sensor element 1. For such punctiform contact as effected by the spacers 6 in three points, spacers of the type shown in FIG. 5 are suitable, in particular, because the balls 8 shown therein are each contacting in a punctiform manner.

Figure 10:
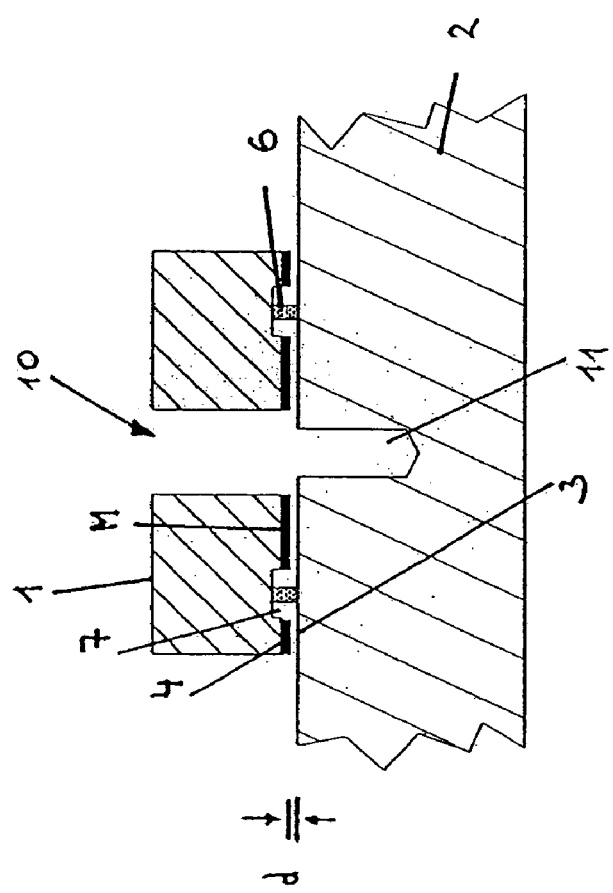
FIG. 10 shows a sensor element similar to that of FIG. 8 in a representation similar to FIG. 2, i.e. during adjustment and prior to final mounting.

FIG. 10 shows the sensor element 1 of FIG. 8, wherein the spacer 6, in contrast to the construction of FIGS. 1 to 4, is not elastically deformable here, but is deformed inelastically, i.e. permanently, in the final mounting step. The bottom surface of the sensor element 1, to which the adhesive layer 4 is also applied, has an annular groove 7 formed therein, in which an annular spacer 6, which is elastically deformable, is mounted in this embodiment. Suitable materials for such spacers 6 are, for example, styrofoam or latex foam rubber. The adhesive layer 4 is provided inside and outside of the ring of the annular groove 7.

Figure 11:
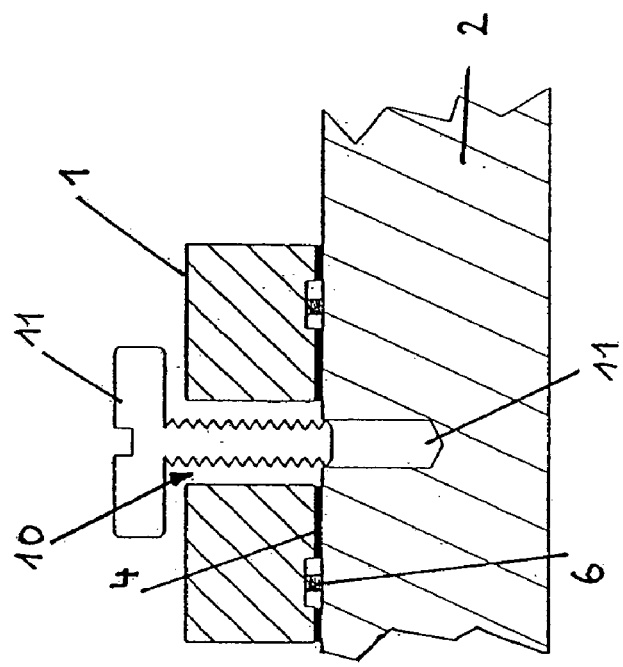
FIG. 11 shows the sensor element of FIG. 10 in the finally mounted condition.

The example of FIG. 11 also has the optional bore 10 provided, which serves to secure the sensor element 1 on the machine part 2. A securing element is inserted through the bore 10, which element is provided in the construction of FIG. 11 as a screw connection 11 between a thread located in a blind-hole and a screw.

For pre-mounting, the sensor element 1 is placed on the attachment surface 3, e.g. a shaft flange. The spacers 6 create a gap having the thickness d. FIG. 10 shows the sensor element 1 after the pre-mounting step, in the position for adjustment in which the sensor element 1 is positioned in a manner suitable for the application. For example, the bore 10 is centered relative to the axis of rotation of a rotary machine part. Said adjustment is easy because the spacer 6 ensures the determined gap between the adhesive layer 4 and the attachment surface 3. If the desired adjustment is achieved, which can be verified by resorting to a sensing unit which senses the sensor element 1, the sensor element 1 is pushed toward the machine part in a final mounting step. The spacers 6 are deformed and the gap is closed. The adhesive layer 4 glues the sensor element 1 to the attachment surface 3.

For additional mounting or securing, the screw connection 11 is then tightened by means of the screw engaging the threaded hole, as shown in FIG. 11. The spacer 6 which was deformed by applying pressure to the sensor element 1, remains in the annular groove 7. However, the screw connection may also assist as a pre-mounting means in realizing the adjustment position by enabling a positional adjustment in the adjustment portion and then causing final mounting with a deformation of the spacer 6 and adhesion (e.g. by tightening the screw connection).

When applying pressure during final mounting a sufficiently defined characteristic deformation curve of the spacers 6 is essential for maintaining the position previously adjusted in the adjustment step. Thus, in principle, three different types of spacers are suitable.

The spacers may comprise elastic materials, so that at least one portion of each spacer is elastically deformed when applying pressure to the adhesive. In particular, high-strength resilient materials may be employed, if the geometry of the spacers 6 is designed such that pressing-on of the sensor element against the resilient effect of the spacer 6 is achievable with a tolerable force.

For the spacers, inelastic deformation may also be employed. This has the advantage that, once the spacers 6 have been deformed, no force is built up that might put stress on the adhesive bond.

Moreover, the spacers may, of course, also be removed so as to initiate the adhesive bonding at the adhesive layer 4. They may then even be non-deformable, and elastic forces of the spacers will no longer play a role.

The above-described sensor element is an example of a structural part which has to be mounted to another structural part in a predetermined position. In doing so, the approaches pursued here follow the path of first effecting a pre-mounting during which the structural part is not finally mounted yet. At first, the final position to be assumed is adjusted to the best possible extent. This may be effected with or without the cooperation of the structural part 1. In a subsequent final mounting step, the structural part is then finally brought into the target position and simultaneously fixed; in the described embodiments, this is done by gluing.

The following Figures relate to effecting the pre-mounting as easily as possible by pre-mounting means. The specific design of the structural part does not matter; in particular, the spacers for the pre-mounting means can be omitted, depending on the type of final mounting.

FIG. 12 shows a pre-mounting means 12, which acts between the machine part and the sensor element. To this end, the pre-mounting means 12 comprises cooperating elements both on the machine part and on the sensor element. On the machine part 2, on which the sensor element 1 is to be mounted later, the pre-mounting means 12 comprises a head 13 which is circumferentially formed as an eccentric 14. The head 13 is located on a pin 15, which is pressed into a bore 16 formed in the machine part 2. This press fit causes the pin 15 to be fixed to the machine part 2 locked against rotation. In contrast thereto, the head 13 is rotatable on the pin 15.

This functional effect of the pre-mounting means 12 can, of course, be achieved also by connecting the head 13 and the pin 15 locked against rotation and by holding the pin 15 rotatably in the bore 16, e.g. by interposition of a viscous medium introduced into the bore 16 prior to insertion of the pin 15.

In addition to the contour line in the shape of an eccentric 14, the head 13 has a frustum-shaped surface 17 which tapers toward the machine part 2. Thus, a frustum-type eccentric having a cylindrical contour surface is obtained. The head 13 thus has a frustum portion and a cylinder portion (the latter being referred to hereinafter as eccentric 14).

The eccentricity is clearly visible in the sectional view of FIG. 13, which was obtained along the line A—A of FIG. 12. Of course, any eccentric, e.g. a circular disk with a decentrally placed axis, will suffice. FIG. 13 further shows that the eccentric 14 has a slot 18 into which a screw driver may be inserted, in order to pivot the eccentric about the pin 15. Said pivoting, as will be explained later, serves to set the adjusted position.

FIGS. 14 to 19 show how the sensor element 1 is mounted to the machine part 2 using the pre-mounting means 12. With regard to the machine part 2 and the sensor element 1, the representation is merely illustrative; what is of importance is essentially the effect of the pre-mounting means 12, as will be explained below by way of example. In particular, the sensor element 1 need not necessarily comprise the above-mentioned spacers 6 for such effect of the pre-mounting means 12.

In addition to the aforementioned heads 13, the pre-mounting means comprise one or more matching recesses 21 on the sensor element 1, using which the sensor element 1 may be suspended from the heads 13. The pre-mounting means 12 are thus essentially formed by two components; on the one hand, the heads 13 which are mounted to the machine part 2, and on the other hand, by one or more recesses 21, by which the sensor element 1 may be suspended from the heads. Of course, the construction shown in FIGS. 14 to 19 may also be exchanged in terms of the arrangement of heads 13 and recesses or recess 21 by providing one or more heads 13 on the sensor element 1 and the corresponding recesses associated therewith, or one continuous recess, on the machine part 2.

In the representations of FIGS. 14 to 19, the sensor element is shown, by way of example, as a linear transducer of a length measuring system. FIGS. 14 to 16 show a first possible structural variant of the pre-mounting means 12, while FIGS. 17 to 19 show a second variant.

For preparation for mounting, a series of heads 13 was first mounted to the attachment surface 3 of the machine part 2, of which heads the sectional views of FIGS. 14 to 19 each show only one. The sensor element 1 may be suspended from the heads 13. Thus, a separate auxiliary element for rigidifying and positioning the sensor element 1 may be omitted.

In the adjustment step, the eccentrics 14 of the heads 13 according to the embodiment of FIGS. 14 to 16 are first adjusted by means of suitable measuring means, which are illustrated in FIG. 14 as a dial gauge 19, such that all eccentrics 14 have a predetermined position relative to the machine part 2.

The dial gauge 19 detects the position of each eccentric 14, i.e. of the cylindrical portion of the head 13, relative to a reference surface 20, which is provided on the machine part 2. For adjustment of the eccentric 14, each head 13 is rotated such that the upper rim of the eccentric 14 has a predetermined distance relative to the reference surface 20. The heads 13 provided in a row on the machine part 2 then consequently have an aligned upper rim of their eccentrics 14.

After this adjustment step, the pre-mounting follows, wherein, as shown in FIG. 14, the transducer element 1 is suspended from the heads 13 by its recess 21. The condition thus achieved is shown in FIG. 15. Together with the frustum-shaped surfaces 17 of the heads 13, a back taper 22 at the recess 21 has the effect that the suspended sensor element 1 can not slide off the heads 13, but is pulled toward the attachment surface 3 due to this specific design. The already effected adjustment of the eccentrics 14 then results in the sensor element 1 being in the desired adjusted position after completion of the pre-mounting step. As already explained above, the small size of the gap d allows to use measuring means for verifying the adjusted position, which means are present for sensing the sensor element anyway.

The spacers 6, which are realized as longitudinal elements here, advantageously cause the predetermined gap d between the adhesive layer 4 and the attachment surface 3. Now, in the final mounting step, the sensor element 1 is pressed onto the machine part 2, thus releasing the back taper 22 from the frustum-shaped surface of each head 13. The already obtained precise adjustment of the upper edge of the eccentric 14 (cf. FIG. 14) and the high-precision design of the recess 21 ensure that the predetermined, adjusted position is maintained when pressing the sensor element 1 onto the attachment surface 3.

In this case, the recess 21 is designed such that it comprises a contact surface 23 on which the eccentrics 14 slide when the sensor element 1 is pressed onto the attachment surface 3. The contact surface 23 of the recess 21 in connection with the adjusted eccentrics 14 causes the gap to be closed; apart from this change in the distance to the machine part 2, the position of the sensor element 1 remains unchanged in the adjusted condition. Thus, in the finally mounted condition of FIG. 16, the sensor element 1 is glued to the attachment surface 3 of the machine part 2 in the adjusted position; the spacers 6 have been removed from the grooves 7.

In contrast to the embodiment of FIGS. 1–5, in the construction of FIGS. 14 to 16 the adjustment step is carried out prior to pre-mounting. The spacers 6 are not involved in adjustment, but allow the high-precision final mounting in the already adjusted position.

This is different in the construction shown in FIGS. 17 to 19. In this case, the sensor element 1 is provided with a bore 24 which allows the heads 13 to be adjusted by means of a screw driver 25 when the sensor element 1 is already suspended from the heads 13. The representation of FIGS. 17 to 19 substantially corresponds to the view shown in FIGS. 14 to 16, so that reference is made to elements already described therein.

In FIG. 17, the sensor element 1 is suspended from the machine part 2 by means of the pre-mounting means 12, which in turn comprise the recess 21 and the heads 13. In contrast to FIG. 14, the heads, however, have not yet been adjusted.

The adjustment step is now carried out after pre-mounting; the corresponding condition is shown in FIG. 18. Again, the position relative to the reference surface 20 is detected with the help of a suitable measuring module, which may comprise, for example, a dial gauge 19. Now, however, not the position of the eccentric 14 itself, but that of a corresponding counter-surface 26 of the sensor element 1 is measured. Each eccentric 14 is rotated through the bore 24 by means of the screw driver 25 such that the desired position of the sensor element 1 relative to the reference plane 20 is achieved. In doing so, any flexure of the sensor element along its longitudinal axis (extending perpendicular to the drawing plane) is detected and minimized. Subsequently, as already explained, the sensor element 1 is glued to the machine part 2 by pressing it thereon or by screwing it into the machine part 2. In the modification of the construction shown in FIGS. 14 to 16, the elastically deformed spacers 6 remain within the grooves 7 here.

What is claimed is:

1. A structural part for mounting to an attachment surface comprising:
   a mounting surface;
   a means for adhesive bonding;
   at least one spacer; and
   at least one recess within the mounting surface,
   wherein said at least one spacer is inserted into the at least one recess such that at least a portion of the at least one spacer protrudes from the at least one recess so as to define a predetermined gap between the mounting surface and the attachment surface when attaching the structural part to the attachment surfacer; and
   wherein by pressing the structural part onto the attachment surface, the at least one spacer is pushed into the at least one recess so as to close the predetermined gap such that the means for adhesive bonding joins the mounting surface and the attachment surface.

2. The structural part as claimed in claim 1, wherein the means for adhesive bonding comprises an adhesive layer, which is thinner than the predetermined gap, so that, during attachment of the mounting surface and the attachment surface the predetermined gap can be closed by either of removing or deforming the spacers.

3. The structural part as claimed in claim 2, further comprising a sensor element of a measuring system.

4. The structural part as claimed in claim 1, wherein the spacers comprise an elastically or inelastically deformable portion.

5. The structural part as claimed in claim 4, wherein said spacers include a multi-part design.

6. The structural part as claimed in claim 1, wherein the spacers comprise an elastomeric cord.

7. The structural part as claimed in claim 1, wherein the spacers cause a line-shaped contact.

8. The structural part as claimed in claim 7, wherein the contact is in the form of an open or closed curve.

9. The structural part as claimed in claim 1, wherein the spacers cause a contact at two, three or more points.

10. The structural part as claimed in claim 2, wherein the spacers border the adhesive layer along at least one edge.

11. The structural part as claimed in claim 1, further comprising a sensor element of a measuring system.

12. The structural part as claimed in claim 11, wherein the sensor element includes a transducer element of an angle or length measuring system.

13. The structural part as claimed in claim 5, wherein said spacers each comprise a generally rigid body, which is supported on a deformable element, said generally rigid body resembling a ball.

14. The structural part as claimed in claim 13, wherein the generally rigid body is a ball and the deformable element is an adhesive.

15. The structural part as claimed in claim 13, wherein the at least one recess comprises a bare into which the generally rigid body is pushed when closing the predetermined gap.

16. A method of mounting a structural part to an attachment surface comprising:
    providing a structural part having a mounting surface, an adhesive layer, at least one spacer and at least one recess;
    positioning the at least one spacer within the at least one recess such that at least a portion of the at least one water protrudes from the at least one recess so as to define a predetermined gap between the mounting surface and the attachment surface when attaching the structural part to the attachment surface;
    attaching the structural part, to the attachment surface;
    adjusting the structural part to a predetermined position, and
    pressing the structural part onto the attachment surface with the spacers being deformed within the recess.

17. The method as claimed in claim 16, wherein the adhesive layer bonds the structural part with the attachment surface when the structural part is pressed onto the attachment surface.

18. The method as claimed in claim 17, wherein the structural part comprises a transducer element of an angle or length measuring system and wherein, during adjustment, the transducer element is read out by sensing means.

19. A sensor mounting arrangement comprising:
    a mounting surface on a sensor;
    an attachment surface on a machine part;
    an adhesive Layer;
    at least one spacer; and
    at least one recess,
    wherein each of the adhesive layer, the at least one spacer and the at least one recess can be positioned on either the mounting surface or the adhesive layer,
    wherein said at least one spacer is inserted into the at least one recess such that at least a portion of the at least one spacer protrudes from the at least one recess so as to define a predetermined gap between the mounting surface and the attachment surface when attaching the sensor to the machine part; and
    wherein by pressing the sensor onto the machine part, the at least one spacer is pushed into the at least one recess so as to close the predetermined gap such that the means for adhesive bonding joins the mounting surface and the attachment surface.

* * * * *